(12) United States Patent
Hassani et al.

(10) Patent No.: US 11,967,184 B2
(45) Date of Patent: Apr. 23, 2024

(54) COUNTERFEIT IMAGE DETECTION

(71) Applicant: Ford Global Technologies, LLC, Dearborn, MI (US)

(72) Inventors: Ali Hassani, Ann Arbor, MI (US); Jonathan Diedrich, Carleton, MI (US); Hafiz Malik, Canton, MI (US); David Hiskens, Ann Arbor, MI (US); Ryan Edwin Hanson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/326,511

(22) Filed: May 21, 2021

(65) Prior Publication Data

US 2022/0374643 A1 Nov. 24, 2022

(51) Int. Cl.
*G06V 40/40* (2022.01)
*B60R 25/01* (2013.01)
(Continued)

(52) U.S. Cl.
CPC .............. *G06V 40/40* (2022.01); *B60R 25/01* (2013.01); *B60R 25/25* (2013.01); *B60R 25/305* (2013.01);
(Continued)

(58) Field of Classification Search
CPC ...... G06V 40/40; G06V 40/16; G06V 40/161; G06V 40/162; G06V 40/164; G06V 40/165; G06V 40/166; G06V 40/172; G06V 10/143; G06V 40/168; G06V 40/45; G06V 10/147; B60R 25/25; B60R 25/31;
(Continued)

(56) References Cited

U.S. PATENT DOCUMENTS 6,092,192 A * 7/2000 Kanevsky ........... H04L 63/0861
713/172
6,593,963 B1 7/2003 Safai
(Continued)

FOREIGN PATENT DOCUMENTS

CN 202887210 U * 4/2013
CN 204795370 U * 11/2015 ............... H04N 5/33
(Continued)

OTHER PUBLICATIONS

Spinoulas, Leonidas, et al. "Multispectral biometrics system framework: Application to presentation attack detection." IEEE Sensors Journal 21.vehicle 13 (2021): 15022-15041. (Year: 2021).*

(Continued)

*Primary Examiner* — Michael Robert Cammarata
(74) *Attorney, Agent, or Firm* — Frank Lollo; Bejin Bieneman PLC

(57) ABSTRACT

A computer, including a processor and a memory, the memory including instructions to be executed by the processor to acquire a first image with a visible and NIR light camera and acquire a second image with an infrared camera. The instructions can include further instructions to determine whether the second image includes a live human face by comparing a first infrared profile included in the second image with second infrared profile included in a previously acquired third image acquired with the infrared camera; and when the second image includes the live human face, output the first image.

20 Claims, 6 Drawing Sheets

(51) Int. Cl.
  *B60R 25/25* (2013.01)
  *B60R 25/30* (2013.01)
  *B60R 25/31* (2013.01)
  *G06F 18/25* (2023.01)
  *G06F 21/32* (2013.01)
  *G06V 10/143* (2022.01)
  *G06V 10/147* (2022.01)
  *G06V 40/16* (2022.01)
  *H04N 23/90* (2023.01)

(52) U.S. Cl.
  CPC ............. *B60R 25/31* (2013.01); *G06F 18/25* (2023.01); *G06F 21/32* (2013.01); *G06V 10/143* (2022.01); *G06V 10/147* (2022.01); *G06V 40/166* (2022.01); *G06V 40/167* (2022.01); *G06V 40/172* (2022.01); *H04N 23/90* (2023.01)

(58) Field of Classification Search
  CPC ...... G06F 21/32; G06K 9/6288; H04N 5/247; H04N 5/332
  See application file for complete search history.

(56) References Cited

U.S. PATENT DOCUMENTS

| | | | |
|---|---|---|---|
| 6,879,247 B2 | 4/2005 | Shimomura et al. | |
| 6,920,236 B2* | 7/2005 | Prokoski | G06V 40/16 356/71 |
| 7,602,947 B1 | 10/2009 | Lemelson et al. | |
| 8,160,293 B1 | 4/2012 | Fridrich et al. | |
| 8,300,890 B1 | 10/2012 | Gaikwad et al. | |
| 8,374,404 B2* | 2/2013 | Williams | G06V 40/19 382/117 |
| 8,718,335 B2 | 5/2014 | Mason et al. | |
| 8,725,330 B2 | 5/2014 | Failing | |
| 9,886,640 B1* | 2/2018 | Chen | G06F 21/32 |
| 10,169,671 B2* | 1/2019 | Matsimanis | G06V 40/40 |
| 10,452,894 B2 | 10/2019 | Zhang et al. | |
| 10,769,415 B1* | 9/2020 | Mostafa | G06V 40/168 |
| 10,990,660 B2 | 4/2021 | Magli et al. | |
| 11,030,470 B2* | 6/2021 | Han | G06K 9/6288 |
| 11,113,510 B1* | 9/2021 | Mostafa | G06V 40/172 |
| 11,178,363 B1* | 11/2021 | Qian | G06V 20/52 |
| 11,373,449 B1* | 6/2022 | Genner | G06V 40/45 |
| 11,481,883 B2* | 10/2022 | Wildermuth | H04N 5/247 |
| 2001/0038717 A1 | 11/2001 | Brown | |
| 2002/0136435 A1* | 9/2002 | Prokoski | G06V 40/45 382/118 |
| 2006/0001921 A1 | 1/2006 | Bailey et al. | |
| 2006/0102843 A1* | 5/2006 | Bazakos | G06V 40/166 250/339.05 |
| 2006/0104488 A1* | 5/2006 | Bazakos | G06V 40/166 382/118 |
| 2006/0261931 A1 | 11/2006 | Cheng | |
| 2008/0059027 A1 | 3/2008 | Farmer et al. | |
| 2009/0232367 A1 | 9/2009 | Shinzaki | |
| 2009/0257671 A1 | 10/2009 | Fridrich et al. | |
| 2010/0102366 A1* | 4/2010 | Lee | H01L 27/14609 257/E31.073 |
| 2010/0102961 A1 | 4/2010 | McCloskey | |
| 2010/0134250 A1* | 6/2010 | Chung | G06V 40/40 340/5.86 |
| 2010/0141770 A1* | 6/2010 | Gomi | G06V 40/40 348/E5.09 |
| 2010/0201374 A1* | 8/2010 | Vasilyev | G01R 31/2656 324/96 |
| 2010/0208951 A1* | 8/2010 | Williams | G06V 10/143 382/117 |
| 2012/0154581 A1 | 6/2012 | Wang et al. | |
| 2012/0176810 A1* | 7/2012 | Galbraith | H01S 3/005 362/553 |
| 2012/0189225 A1 | 7/2012 | Li | |
| 2012/0230536 A1 | 9/2012 | Fridrich et al. | |
| 2013/0024123 A1 | 1/2013 | Ochs et al. | |
| 2013/0077958 A1* | 3/2013 | Xu | G02B 5/201 359/359 |
| 2013/0311001 A1 | 11/2013 | Hampiholi | |
| 2013/0342702 A1* | 12/2013 | Zhang | G06V 40/45 348/E5.09 |
| 2013/0342703 A1* | 12/2013 | Lin | H04N 5/33 382/103 |
| 2014/0162596 A1 | 6/2014 | Villa-Real | |
| 2014/0278529 A1 | 9/2014 | Matos | |
| 2014/0294262 A1 | 10/2014 | Schuckers et al. | |
| 2014/0307929 A1 | 10/2014 | Nechyba et al. | |
| 2015/0110418 A1 | 4/2015 | Bayram et al. | |
| 2015/0281599 A1* | 10/2015 | Slaby | H04N 5/265 348/164 |
| 2015/0304612 A1 | 10/2015 | Richards | H04N 7/188 348/159 |
| 2016/0019420 A1* | 1/2016 | Feng | G06V 40/40 382/117 |
| 2016/0019421 A1* | 1/2016 | Feng | G06V 40/18 382/117 |
| 2016/0048736 A1* | 2/2016 | Chu | G06T 7/60 382/118 |
| 2016/0086018 A1* | 3/2016 | Lemoff | G06V 40/173 382/118 |
| 2016/0206216 A1 | 7/2016 | Kirenko | |
| 2017/0091550 A1* | 3/2017 | Feng | G06T 7/0012 |
| 2017/0104916 A1* | 4/2017 | Mueller | H04L 12/2823 |
| 2017/0242134 A1 | 8/2017 | Matsuoka | |
| 2018/0039845 A1* | 2/2018 | Chen | G06V 40/166 |
| 2018/0048474 A1 | 2/2018 | Landrock et al. | |
| 2018/0240216 A1 | 8/2018 | Dirik et al. | |
| 2019/0057268 A1* | 2/2019 | Burge | G06V 40/40 |
| 2019/0057502 A1 | 2/2019 | Wang et al. | |
| 2019/0102873 A1 | 4/2019 | Wang et al. | |
| 2019/0228248 A1* | 7/2019 | Han | G06V 10/143 |
| 2020/0053297 A1* | 2/2020 | Tokizaki | G01J 5/0846 |
| 2020/0134342 A1* | 4/2020 | Parupati | G06F 21/32 |
| 2020/0218772 A1 | 7/2020 | Zhang et al. | |
| 2020/0250448 A1 | 8/2020 | Joshi et al. | |
| 2020/0273157 A1 | 8/2020 | Shao | |
| 2020/0334450 A1* | 10/2020 | Shen | G06V 10/803 |
| 2020/0342245 A1* | 10/2020 | Lubin | G06V 40/70 |
| 2020/0402223 A1 | 12/2020 | Ghosh et al. | |
| 2021/0192340 A1 | 1/2021 | Stonehouse et al. | |
| 2021/0049391 A1 | 2/2021 | Zou et al. | |
| 2021/0074138 A1* | 3/2021 | Micko | G08B 21/0492 |
| 2021/0166045 A1* | 6/2021 | Kwak | G06V 40/165 |
| 2021/0168347 A1* | 6/2021 | Margolin | G06V 40/172 |
| 2021/0241014 A1* | 8/2021 | Choiniere | G06K 9/623 |
| 2021/0256281 A1* | 8/2021 | Henson | G06V 40/45 |
| 2021/0264183 A1* | 8/2021 | Wolf | G06V 40/45 |
| 2022/0012511 A1* | 1/2022 | Rowe | G06V 40/40 |
| 2022/0084223 A1 | 3/2022 | Norris et al. | |
| 2022/0284228 A1* | 9/2022 | Li | G06V 10/143 |
| 2022/0398820 A1* | 12/2022 | Abd-Almageed | G06V 10/141 |
| 2023/0005240 A1* | 1/2023 | Chen | H04N 25/702 |
| 2023/0056564 A1 | 2/2023 | Han et al. | |
| 2023/0091865 A1 | 3/2023 | Chen et al. | |
| 2024/0013572 A1* | 1/2024 | Yang | G06V 10/751 |

FOREIGN PATENT DOCUMENTS

| | | | | |
|---|---|---|---|---|
| CN | 108319986 A | | 7/2018 | |
| CN | 110287672 A | | 9/2019 | |
| CN | 111611977 A | * | 9/2020 | ......... G06K 9/00221 |
| CN | 111738065 A | * | 10/2020 | |
| WO | 2014078696 A2 | | 5/2014 | |
| WO | WO-2020048140 A1 | * | 3/2020 | ......... G06K 9/00221 |
| WO | WO-2021157790 A1 | * | 8/2021 | |
| WO | WO-2022134754 A1 | * | 6/2022 | |

OTHER PUBLICATIONS

M. Krišto and M. Ivasic-Kos, "An overview of thermal face recognition methods," 2018 41st International Convention on Infor-

(56) References Cited

OTHER PUBLICATIONS mation and Communication Technology, Electronics and Microelectronics (MIPRO), 2018, pp. 1098-1103, doi: 10.23919/MIPRO.2018.8400200. (Year: 2018).*
Hermosilla, Gabriel, et al. "A comparative study of thermal face recognition methods in unconstrained environments." Pattern Recognition 45.7 (2012): 2445-2459. (Year: 2012).*
K. R. Kakkirala, S. R. Chalamala and S. K. Jami, "Thermal Infrared Face Recognition: A Review," 2017 UKSim-AMSS 19th International Conference on Computer Modelling & Simulation (UKSim), 2017, pp. 55-60, doi: 10.1109/UKSim.2017.38. (Year: 2017.*
H. Steiner, A. Kolb and N. Jung, "Reliable face anti-spoofing using multispectral SWIR imaging," 2016 International Conference on Biometrics (ICB), 2016, pp. 1-8, doi: 10.1109/ICB.2016.7550052. (Year: 2016).*
Sánchez-Sánchez MA et al., Convolutional Neural Network Approach for Multispectral Facial Presentation Attack Detection in Automated Border Control Systems. Entropy (Basel). Nov. 14, 2020;22(11):1296. doi: 10.3390/e22111296. PMID: 33287064; PMCID: PMC7712294. (Year: 2020).*
S. Hu, N. Short, B. S. Riggan, M. Chasse and M. S. Sarfraz, "Heterogeneous Face Recognition: Recent Advances in Infrared-to-Visible Matching," 2017 12th IEEE International Conference on Automatic Face & Gesture Recognition (FG 2017), Washington, DC, USA, 2017, pp. 883-890, doi: 10.1109/FG.2017.126. (Year: 2017).*
Nagendran, N. et al., "Security and Safety With Facial Recognition Feature for Next Generation Automobiles," International Journal of Recent Technology and Engineering (IJRTE), vol. 7 Issue-4S, Nov. 2018, 6 pages.
Scherhag, U. et al., "Detection of Face Morphing Attacks based on PRNU Analysis," IEEE Transactions on Biometrics, Behavior, and Identity Science (T-Biom), Oct. 2019, 16 pages.
Mohd Norzali, et al., "Internal State Measurement From Facial Stereo Thermal and Visible Sensors Through SVM Classification," ARPN Journal of Engineering and Applied Sciences, Jan. 2015, 8 pages.
Kim, et al. "A Motion and Similarity-Based Fake Detection Method for Biometric Face Recognition Systems," IEEE Transactions on Consumer Electronics, vol. 57, No. 2, May 2011, 7 pages.
Angelopoulou, E., "The Reflectance Spectrum of Human Skin," University of Pennsylvania, Scholarly Commons, Department of Computer & Information Science, Dec. 20, 1999, 16 pages.
Anderson, R,. et al., "The Optics of Human Skin," The Journal of Investigative Dermatology, vol. 77, No. J, 1981, 7 pages.
Cooksey, C., et al., "Reflectance Measurements of Human Skin," National Institute of Standards and Technology, Oct. 27, 2020, 3 pages.
Barnes, P. et al., "Spectral Reflectance," U.S. Department of Commerce, Technology Administration, National Institute of Standards and Technology, Mar. 1998, 164 pages.
Mhou, K. et al., "Face Spoof Detection Using Light Reflection in Moderate to Low Lighting," 2nd Asia-Pacific Conference on Intelligent Robot Systems, 2017, 6 pages.
Jacquez, J. et al., "Spectral Reflectance of Human Skin in the Region 0.7-2.6," http://jap.physiology.org/, Sep. 13, 2016, 3 pages.
Cooksey, C. et al., "A collection and statistical analysis of skin reflectance signatures for inherent variability over the 250 nm to 2500 nm spectral range," National Institute of Standards and Technology, Jun. 4, 2014, 2 pages.
Chen et al. "Determining Image origin and Integrity Using Sensor Noise", IEEE Transactions on Information Forensics and Security, vol. 3, No. 1, Mar. 2008.
Debiasi et al. "PRNU-based Detection of Morphed Face Images", 2018 International Workshop on Biometrics and Forensics (IWBF), 2018.
Non-Final Office Action for U.S. Appl. No. 17/326,460 as issued by the USPTO dated Oct. 19, 2022.
Non-Final Office Action for U.S. Appl. No. 17/326,490, filed May 21, 2021, as issued by the USPTO Jan. 23, 2023.
Non-Final Office Action for U.S. Appl. No. 17/326,490, filed May 21, 2021, as issued by the USPTO dated May 22, 2023.
Fridrich, J., "Digital image forensics," IEEE, Mar. 27, 2009, 12 pages.
Non-Final Office Action for U.S. Appl. No. 17/326,581, filed May 21, 2021, as issued by the USPTO dated Jun. 21, 2023.
Maser, B., et al., "PRNU-based Detection of Finger Vein Presentation Attacks," IEEE Xplore, 2019, 6 pages.
Akshatha, K.R., et al., "Digital camera identification using PRNU: A feature based approach," Science Direct, Digital Investigation, Nov. 3, 2016, 9 pages.
Non-Final Office Action for U.S. Appl. No. 17/326,581, filed May 21, 2021, as issued by the USPTO dated Jan. 19, 2024.
Kurosawa, K. et al., "Case studies and further improvements on source camera identification," Proceedings of SPIE, Mar. 22, 2013, 15 pages.
Lopez-Alonso, J. et al., "Spatial-temporal characterization of noise in web cameras," Proceedings of SPIE, Jul. 8, 2023, 6 pages.
San Choi, K. et al., "Auton1atic source camera identification using the intrinsic lens radial distortion," Optics Express, Nov. 27, 2006, 15 pages.
Non-Final Office Action for U.S. Appl. No. 17/326,450, filed May 21, 2021, as issued by the USPTO dated Dec. 13, 2023.
Final Office Action for U.S. Appl. No. 17/326,450, filed May 21, 2021, as issued by the USPTO Mar. 1, 2024.

* cited by examiner

COUNTERFEIT IMAGE DETECTION

BACKGROUND

Vehicles can be equipped with computing devices, networks, sensors, and controllers to acquire and/or process data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
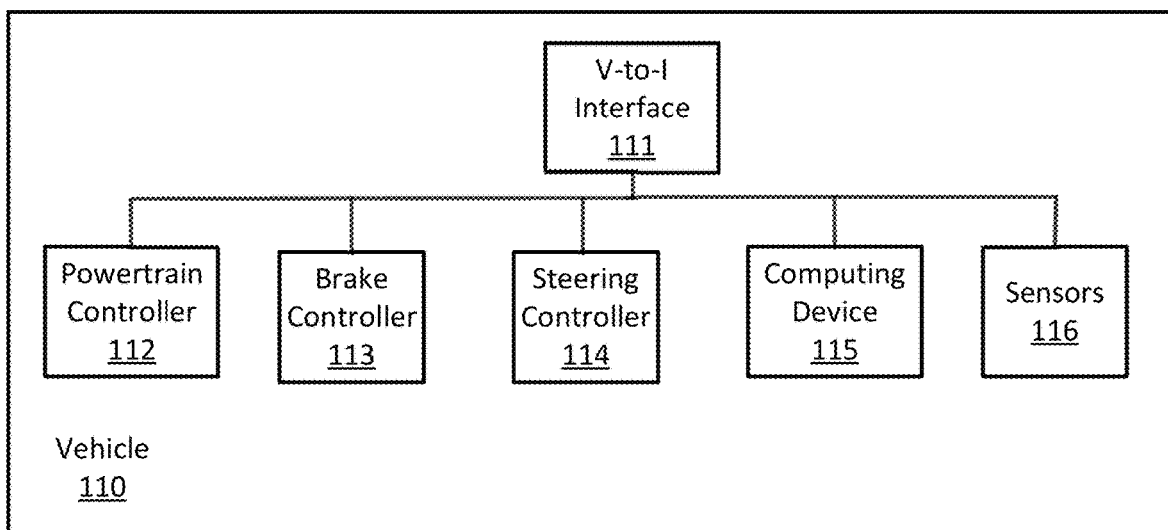
FIG. 1 is a diagram of an example vehicle.

Vehicles can be equipped with computing devices, networks, sensors, and controllers to acquire and/or process data regarding the vehicle's environment and to operate the vehicle based on the data. Computing devices and sensors included can be used for tasks other than operating the vehicle. For example, a camera in a vehicle can be programmed to acquire an image of a human approaching the vehicle and, upon determining the identity of the human based on facial recognition software, unlock the vehicle's doors to permit the operator to enter the vehicle. Likewise, cameras included in the interior of the vehicle can acquire one or more images of a human and, upon determining the identity of the operator based on facial recognition software, accept commands from the human to operate the vehicle.

Facial recognition is a type of biometric authentication, where human body measurements are used to determine an identity of a human to perform access control. An example of biometric authentication is facial recognition, where an image of a person is acquired by a camera and the image is processed to extract facial features that are then stored in a computer memory as trained model. At a later time, a computer can acquire a second image of a person with a second camera and process the image using facial recognition software to extract a second set of facial features that can be compared to the first set of facial features from the trained model. If the two sets of facial features are determined to match, the person imaged by the second camera is authenticated. Biometric authentication can be used to control access to physical spaces including buildings, homes, or vehicles, etc., and can be used to grant permission to operate computers, phones, or other devices. Biometric authentication software can be executed on a computing device included in the location or device being accessed, or the image data can be uploaded to a cloud-based server that maintains a database of trained models for execution. The results of performing the biometric authentication can be downloaded to the device seeking authentication and permission to operate a vehicle. Successful authentication can be used to unlock a vehicle door or enable vehicle controls. In other examples, successful authentication can be used for security applications such as access to a location or room by unlocking a door, or yet further alternatively or additionally access to a device such as a computer or a cell phone by enabling input devices like a keyboard or mouse or granting access to files.

As biometric authentication technology advances, techniques for tampering with camera data to fool a biometric authentication system into authenticating a counterfeit image have advanced also. Causing a biometric authentication system to accept a counterfeit image as real in this context is called "spoofing". For example, counterfeit images can be generated using neural network(s) programmed to generate "deep fake" images and videos. A deep fake image or video is an image or video where an image of one person's likeness can be edited onto an image of another person's body, or a person's image can be transplanted into a scene they have never inhabited in real life. High-resolution images of people's face have also been used create counterfeit images used to fool biometric authentication systems. To address this, three-dimensional (3D) depth mapping systems have been implemented on smart phones to prevent deep fakes and high-resolution images from being used to spoof facial recognition systems. Life-like masks, using high-resolution printing or molded latex technology have recently been employed to fool facial recognition system using 3D depth mapping. Sophisticated image processing techniques requiring large amounts of computing resources can be required to determine the difference between a mask and a live human, and in examples where high quality theatrical masks are used, even sophisticated image processing can be unsuccessful in determining counterfeit images.

Techniques discussed herein detect image tampering, e.g., where a counterfeit image has been used, by first acquiring an infrared image of the person to be enrolled in the biometric authentication system in addition to a grayscale or color image acquired using visible and near infrared (NIR). The infrared image can then be stored in the trained model along with the facial features extracted from the grayscale or color image. At challenge time, when a second grayscale or color light image is acquired from the person to be authenticated, a second infrared image is acquired and compared to the first infrared image stored in the trained model. Because infrared images are based on thermal data emitted from a person's face, counterfeit images based on videos, photographs or masks cannot mimic the stored infrared image. Techniques discussed herein improve biometric authentication by acquiring and comparing infrared images to stored data to confirm that a live human rather than a counterfeit is being imaged by the system. Acquiring and comparing an infrared image does not require a 3D depth sensor and uses fewer computing resources than existing techniques to successfully determine that a live human subject and not a counterfeit is being imaged. Following successful determination that a live human is being imaged, the grayscale or color image of the human face can be output to a biometric authentication system, where the grayscale or color image can be processed using facial recognition software to determine whether the human face matches a previously stored human face.

FIG. 1 is a diagram of a vehicle 110 including a computing device 115 and sensors 116. The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®)) or cellular networks. V-to-I interface 111 may accordingly include processors, memory, transceivers, etc., configured to utilize various wired and/or wireless networking technologies, e.g., cellular, BLUETOOTH®, Ultra-Wide Band (UWB),® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc. Using data received in the computing device 115, e.g., the sensor data from the sensors 116, the server computer, etc., the computing device 115 may make various determinations and/or control various vehicle 110 components to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to share data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110.

The vehicle 110 is generally a land-based vehicle 110 capable of operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
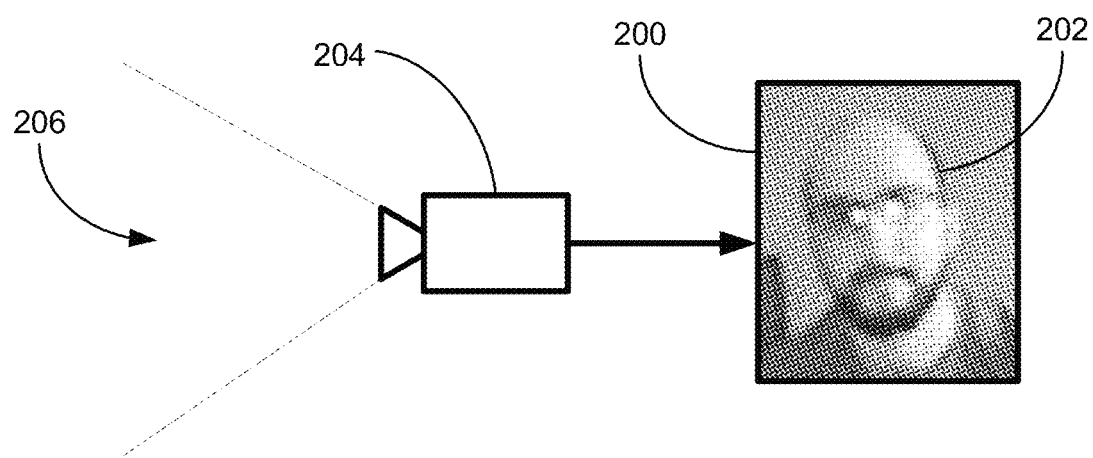
FIG. 2 is a diagram of an example image.

FIG. 2 is a diagram of an example image 200 of a human face 202; the image 200 could be grayscale or color but is shown in black and white rendering pursuant to Patent Office drawing rules. Image 200 can be acquired using a visible and NIR light camera 204 having a field of view 206 that includes a human face 202. The visible and NIR light camera 204 can be a video camera and the grayscale or color image 200 can be a frame from a video sequence, for example. The grayscale or color image 200 can be a monochrome image or an image that include red, green, and blue (RGB) color channels. Detection cameras used to acquire visible and NIR light images operate in the 400 to 1000 nanometer (nm) range to acquire visible and near infrared (NIR) light. Visible and NIR light cameras 204 acquire data from illumination reflected from objects in the field of view 206 of the visible and NIR light camera 204. Visible and NIR light images can be acquired based on emitting visible and NIR light from a light source and acquiring reflected light. Visible and NIR light cameras 204 can also acquire data using ambient light. Cameras including CMOS image sensors can be configured to acquire visible and NIR light and can be mosaiced to permit red, green, blue and NIR light to reach photo receptors included in the image sensor.

Grayscale or color image 200 can be processed using facial recognition software executing on a computing device 115 to extract facial features from the image data. Example image processing software that can be used to extract facial features is included in Dlib, a toolkit containing machine learning algorithms and tools for creating complex software in C++. Dlib is available at Github.com and is available on an open source license which permits its use free of charge. For example, pixel values in an image can be processed using a Dlib routine called SURF, for speeded-up robust features, which can be used to detect particular shapes of pixel values, such as edges and corners. Detected shapes in adjacent or overlapping neighborhoods can be joined to form features such as corners of eyes and corners of a mouth. Features can be further processed to determine more complex features. For example, a right eye corner and a left eye corner can be combined to determine a location of an eye. Facial features can include the inner and outer corners of both eyes, the corners of the mouth, edges of the nose, etc.

At enrollment time, a grayscale or color image 200 that includes a human face 202 can be acquired and facial features extracted from the image. Enrollment in this context means a time at which images of a person are acquired and communicated to a computing device for the first time for biometric authentication process. The extracted facial features can be stored in memory included in the computing device 115 in a trained model corresponding to the human face 202. The trained model can also be uploaded to a database included in a cloud-based server where it can be distributed to locations so that images acquired during enrollment phase can be used at multiple locations, for example. Advantages of storing feature sets rather than images include the much lower storage requirements of features as opposed to images and faster processing because feature extraction only has to be performed once at enrollment time.

At enrollment time, techniques discussed herein can also acquire an infrared image that includes the human face to be enrolled. Cameras used to acquire infrared images include liveness verification cameras, which acquire short wave infrared light (SWIR) in the 1000 to 2500 nm wavelength range or long wave infrared light (LWIR) in the 8000 to 14000 nm range as discussed in relation to FIG. 3, below. LWIR images are acquired based on thermal photons emitted from the subject e.g., a human face. SWIR images are acquired based on reflected light emitted by an SWIR illuminator. Images from the detection cameras can be used to detect and identify human faces in the field of view. Images from the liveness verification cameras can be processed to determine a liveness infrared profile corresponding to the human face included in the infrared image. For example, a histogram can be formed based on the pixels of the infrared image or pixels determined to correspond to the human face in the infrared image. The histogram can be processed to determine statistical properties of the pixel values in the histogram. Histogram-based statistics assume the pixel values are Gaussian distributions and determine a mean and variance of the distribution. The histogram statistics can be stored in less memory than a complete infrared image, thereby making efficient use of computing resources.

Techniques described herein can also process images acquired by SWIR detection cameras to extract and store facial features from the acquired infrared images. The features can be extracted using image processing software as discussed above. For images acquired by LWIR liveness verification cameras, the features can correspond to temperature differentials caused by blood flow and facial features that interrupt or cover the skin, e.g., eyes and hair. In addition, the portion of the infrared image that corresponds to the human face can be stored for later comparison with a challenge infrared image. All of these techniques reduce memory requirements over storing an entire infrared image for comparision at a later time.

At a time after enrollment, referred to herein as a challenge time, a visible and NIR light camera 204 can acquire a second grayscale or color image of a person to be authenticated by the computing device 115. Machine vision software as discussed above can be used to extract a second set of facial features from images acquired during identification or verification phase. The second set of facial features can be compared to the first set of facial features extracted from the set of image acquired during enrollment phase by the computing device 115 using facial identification software. An example of facial identification software is Face Tracker. Face Tracker is a facial recognition software library written in C++ and available on facetracker.net under the MIT software license. Facial identification software can perform processing on the two sets of features to extract ratios of distances between features and compare the ratios extracted from the two sets of features. For example, as discussed above, facial feature detection routines such as SURF in Dlib can determine locations on a face corresponding to the center of each eye and the center of a mouth. Ratios of the distance between the centers of the eyes to distances between the center of each eye and the center of the mouth can be formed. Ratios between facial distances are constant for a given person's face regardless of the absolute size in pixels. Ratios between feature distances can be determined and stored in a computing device 115. During verification or identification phase, a second image of a person's face can be acquired and used to identify the person by comparing the determined ratios between facial features. If the ratios between features match, the person is determined to be the same person as in the previously acquired image. In this fashion differences in absolute distances due to distances from the first and second camera and differences in poses between the two images can minimized. Successful authentication based on matching of facial features between the first and second facial feature sets results in access being granted to the person in the second or challenge image.

The second liveness verification image can be used to determine liveness of the subject presented for facial recognition in the grayscale or RGB color image. Techniques for liveness determinination will depend upon the wavelengths of infrared light acquired by the infrared camera. Histogram analysis can be used for SWIR images where histogram statistics including mean and variance from the enrollment livenenss verification image can be compared to histogram statistics from the challenge liveness verification image. LWIR cameras can extract thermal data Successful comparision between one or more of histogram-based pixel value statistics, extracted facial features or template matching can confirm subject liveness and permit facial recognition based on grayscale or RGB color images to proceed.

Figure 3:
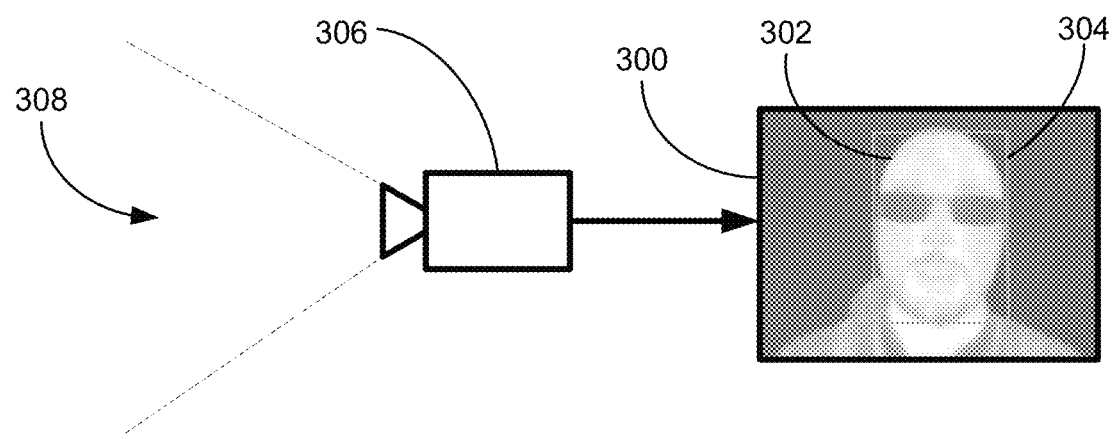
FIG. 3 is a diagram of an example infrared image.

FIG. 3 is an infrared image 300 of a human face 302 acquired with an SWIR or LWIR liveness verification camera. Techniques discussed herein acquire a second liveness verifiation image with an SWIR or LWIR liveness verification camera at the same time the challenge grayscale or RGB color image is acquired by a detection camera. Each type of infrared liveness verification camera has tradeoffs corresponding to the resolution, sensitivity and cost of the camera. SWIR cameras can determine histogram statistics that can separate human faces from counterfeit images with high preciscion. More expensive LWIR cameras with lower x, y resolution can generate thermal images that can be used to determine thermal maps of human faces based on emitted infrared radiation. The particular infrared technology used for a liveness verification camera can depend upon a cost/benefit analysis determined based on the cost of the infrared camera system and the benefits corresponding to the probability of encountering various types of counterfeit images.

Infrared image 300 can generated by an LWIR camera 306 acquiring photons of infrared light corresponding to heat emitted by objects in the field of view 308 of the infrared camera 306. To prevent a counterfeit image from being used to spoof a biometric authentication system based on facial recognition, the infrared image 300 can be processed to determine that a live human face that emits infrared light is included in the infrared image 300. Counterfeit images do not emit infrared light at wavelengths in the LWIR range because they do not include 98.6 degree blood flow beneath the surface of skin that emits infrared light corresponding to body heat. Photographs and latex masks do not emit infrared radiation corresponding to body heat. Even if a photograph or latex mask were heated to 98.6 degrees to emit infrared radiation, the pattern of infrared emission captured by an infrared camera would not match the pattern of infrared light emitted by blood vessels beneath the surface of facial skin. Infrared image 300 can be acquired using a commercially available infrared camera 306. An example of a commercially available infrared camera 306 is the LWTS available from L3Harris Technology, Melbourne FL 32919. LWIR cameras 306 acquire thermal photons emitted from objects in the 2500-14000 nm wavelength range. This wavelength range includes heat emitted by a human face generated by blood flow beneath the skin. As seen in infrared image 300, exposed skin portions of a human face 302 emit infrared radiation (light pixels), while portions of the human face 302 face covered by facial hair and glasses, for example, do not emit infrared radiation (dark pixels).

Infrared image 300 can also be acquired using an SWIR camera 306. SWIR cameras can be constructed using indium gallium arsenide to acquire infrared wavelengths in the 1000 to 2500 nm range. A corresponding grayscale or RGB color image 200 can be processed using image processing software as discussed above to determine the area of the infrared image 300 occupied by the human face 302. A bounding box 304 can be constructed around the human face portion of the image based on determining a bounding box 304 using a grayscale or RGB color image acquired by a visible and NIR light camera co-registered with the infrared image 300. Co-registered means that the infrared camera that acquires infrared images 300 and the visible and NIR light camera that acquires a visible and NIR light image 200 are configured to acquire images from the same field of view. Objects such as a human face will occur at the same location in images acquire by co-registered sensors. The sensors can have different numbers of pixels due to differing resolutions, but objects will occur at the same size and locations relative to the centers of the images in co-registered sensors.

Image processing software as discussed above can determine a histogram of pixel values in the infrared image 300. Portions of the infrared image that include a live human face will typically include pixels having histogram values previously determined based on an enrollment infrared image 300 to include light radiated at 12 microns. Using a bounding box surrounding the human face portion of the image based on pixel values can permit a subset of the image data to be stored in memory thereby reducing the amount of storage required. At challenge time, a second infrared image 300 of a human face to be authenticated is acquired by the computing device 115 and processed using a bounding box 304 determined based on a visible and NIR image 200 that includes the second human face 302. The second infrared image 300 can be processed to determine whether a bounding box 304 includes a live human face by comparing the pixel values in the bounding box 304 to the pixel values in the previously acquired bounding box 304. Histogram-based pixel value statistics including mean and variance can be determined based on the enrollment image 300 and the challenge image 300 and compared. The mean and variance of the pixel values in the histogram can be compared, and when they are equal within an empricially determined tolerance, the infrared image 300 is determined to include a live human face. When it is determined that the infrared image 300 includes a live human face, a grayscale or color image 200 corresponding to the infrared image 300 can be acquired by a visible and NIR light camera and output to a facial recognition process executing on the computing device 115 to identify the person in the grayscale or color image 200.

In examples where a plurality of human faces have been enrolled in a biometric authorization system, a visible and NIR image 200 of the person seeking authentication can be acquired. An identity of the human face in the visible and NIR image 200 can be determined by processing the visible and NIR image 200 using facial recognition software as discussed above. The identity of the person can be used to determine which infrared enrollment image 300 data to use to determine liveness based on a challenge infrared image 300. A plurality of sets of enrollment data including histogram-based pixel value statistics, facial features or templates based on enrollment infrared images 300 can be stored in a computing device 115 or a cloud-based server computer in communication with computing device 115 via V-to-I interface 111. An identity of a person seeking authorization can be used to select the infrared image 300 data to be used to determined liveness. In examples where an SWIR or LWIR image 300 is used to determine liveness, generic infrared data can be used based on acquiring a plurality of real infrared images 300 and spoofed infrared images 400. For histogram-based pixel value statistics, differences between individuals is not significant compared to differences between live images 300 and spoofed images 400.

Facial recognition would be used to determine which enrolled profile to compare against. In examples where thermal profiles are used, a generic set of templates may be used because of the large differences between images of live human faces and spoofed human faces. E.g. a classifier could be trained on general live human faces and cropped images of spoofed human faces to determine a liveness score. In this fashion liveness determineation can be successfully de-coupled from a facial recognition process. facial recognition would be used to determine which enrolled profile to compare against. A template matching process could be done for either LWIR imaging or SWIR imaging, where a similarity score is generated from the challenge vs expected template. SWIR analysis would depend more on skin reflectance of 1100-1400 nm light than blood flow. A determination as to which infrared camera to use will depend upon camera cost and difficulties with resolution management and image co-registration.

In addition to determining liveness by comparing histogram-based statistics, a previously acquired bounding box 304 from the first infrared image 300 can be recalled from memory and compared to the second bounding box 304 from the second or challenge image to determine similarity of the challenge and enrolled images. Comparing the challenge infrared image 300 to an enrolled and stored infrared image can prevent spoofing by heating the object used to create the counterfeit image up to human body temperature. A counterfeit image formed by acquiring an infrared image 300 from a picture or a mask heated up to 98.6 degrees Fahrenheit can have the same average pixel values as a live human face but would not have the certain image details as a live human face corresponding to blood flow beneath the surface. Pixel values in an infrared image of a live human face includes image detail corresponding to blood flow, diffusion of the heat from the blood flow into surrounding tissue and differential cooling due to differences in tissue shape and density. An infrared image 300 of a live human face can include detail corresponding to blood flow, diffusion and cooling that cause patterns that persist for a given person and can be used to identify the person by comparing a first infrared image, i.e., an enrollment infrared image, with a second infrared image, i.e., a challenge infrared image acquired at a later time.

The comparison can be performed using template matching, where one or more of the bounding boxes 304 are resized to make them similarly sized and located in the infrared image 300 and then subtracted. As discussed above, a generic template based on a plurality of real infrared images 300 can also be determined. If the residual following the subtraction is lower than an empirically determined threshold, the two images are determined to match. More sophisticated techniques including image correlation can also be used to compensate for differences in absolute pixel values, for example. Thermal images can be matched by performing image to image correlation with an enrollment infrared image 300 to determine whether a challenge infrared image 300 is real or counterfeit. A "fakeness" score F, where a score greater than 0.5 can indicate a counterfeit and a score less than 0.5 can indicate a real human face corresponding to the enrollment image can be determined according to the equation:

$$F=1-\alpha\times\rho(profile, challenge) \quad (1)$$

Where $\alpha$ is an arbitrary scaling factor and $\rho$(profile, challenge) is a function that determines a correlation coefficient between the profile, which is the data in the bounding box 304 from the first infrared image 300 stored in memory at enrollment time and challenge, which is the data in the bounding box 304 from the second infrared image 300 acquired to authenticate the person. Scaling factor $\alpha$ can be determined based on a plurality of real and counterfeit images to optimally separate them.

Figure 4:
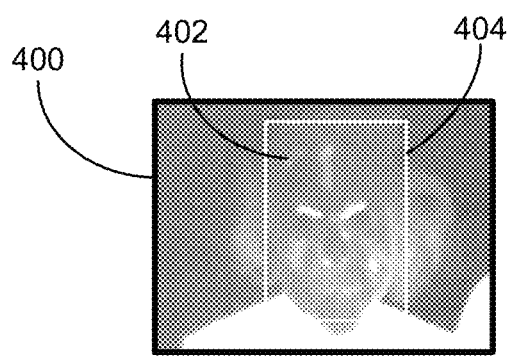
FIG. 4 is a diagram of an example infrared counterfeit image.

FIG. 4 is diagram of a counterfeit infrared image 400. Counterfeit infrared image 400 includes a human wearing a latex mask 402, surrounded by a bounding box 404 that identifies the facial portion of counterfeit image 400. Counterfeit infrared image 400 illustrates the difference in infrared radiation emitted from a human face 302 in infrared image 300 and the same person's face covered by a latex mask 402. Correlating the thermal profile data in bounding box 404 from counterfeit image 400 would yield a higher difference for a template match and a lower correlation coefficient when correlated against a previously acquired thermal profile included in a bounding box 304 that included a live human subject than a bounding box 304 that included thermal profile from an infrared image 300 that included a live human subject.

Figure 5:
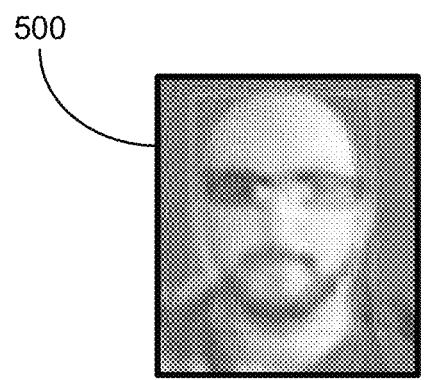
FIG. 5 is a diagram of an example multispectral image.

FIG. 5 is a diagram of a multispectral image 500. A grayscale or color image 200 and an infrared image 300 can be combined to form a multispectral image 500. Image 500 can be determined by acquiring a grayscale or color image 200 with a visible and NIR light camera 204 and acquiring an infrared image 300 with an infrared camera 306 and adding the two images according to the equation:

$$I_c = \alpha_v I_v + \alpha_i I_i \quad (2)$$

Where $I_c$ is the multispectral image 500, $I_v$ is the grayscale or color image 200, $I_i$ is the infrared image 300, $\alpha_v$ is an empirically determined constant multiplied times the pixels of image $I_v$, and $\alpha_i$ is an empirically determined constant multiplied times the pixels of image $I_i$. Following pixel-wise multiplication by constants $\alpha_v$ and $\alpha_i$, and before adding, images $I_v$ and $I_i$ can be co-registered by detecting faces in each image using facial feature detection routines from the Dlib image processing library as discussed above in relation to FIG. 2. Co-registering means that the image data from one or more of the images $I_v$ amd $I_i$ can be translated and rotated to bring the facial features of the two images into alignment thereby making the facial feature in the two images align before pixel-wise addition. The constants $\alpha_v$ and $\alpha_i$ can be selected to permit the two images to be combined while preserving details from both by acquiring a plurality of grayscale or color images 200 and infrared images 300 and combining them using different values of $\alpha_v$ and $\alpha_i$. Combining grayscale or color images 200 and infrared images 300 using equation 2 can permit processing the single multispectral image 500 to perform both liveness and facial identification process on a single image, thereby saving memory space in computing device 115.

The techniques discussed herein regarding counterfeit image detection can be subject to reinforcement learning. Reinforcement learning is performed by keeping statistics regarding the number of correct and incorrect results achieved by a counterfeit image detection system in use and using the statistical results to re-train the counterfeit image detection system. For example, assume a counterfeit image detection system is used as input to a biometric authorization system used to unlock a vehicle, building, or device when approached by a valid user. A valid user is a user with prearranged permission to use the vehicle, building, or device. In an example where the counterfeit image detection system fails to correctly verify a camera and unlock the vehicle, the user can be forced to unlock the vehicle manually with a key or fob, or use a 2-factor authorization system such as entering a code sent to a cell phone number. When a user is forced to unlock the vehicle manually, the counterfeit image detection system can store data regarding the incorrect camera source data including the image of the user.

Determining what to do with data regarding the incorrect counterfeit image detection can be based on a reward system. A reward system retrains the counterfeit image detection system corresponding to the counterfeit image detection data depending upon the outcome of the failure to authenticate. If the potential user fails to gain access to the vehicle, it is assumed that the failed attempt was an attempted spoof, and the data is appended to a training dataset of likely spoof data. If the potential user gains access using one of the manual approaches, for example keys, fobs, or 2-factor authorization, the data is appended to a training dataset of false negatives to be corrected in the training process. The authentication system can be retrained based on the updated training dataset periodically or when the number of new counterfeit image detection datasets added to the training dataset exceeds a user-determined threshold. Retraining can be applied to both deterministic authentication systems based on Gaussian parameters and deep neural network-based systems.

Data regarding failure to verify counterfeit image detection can be federated or shared among a plurality of vehicles. The data regarding failure to verify counterfeit image detection can be uploaded to a cloud-based server that includes a central repository of training datasets. The uploaded verify a camera source datasets and corresponding outcomes can be aggregated in updated training datasets and results of retraining based on the new data can be compared to results for the previous training. If the new training dataset improves performance, the new trained model can be pushed or downloaded to vehicles using the counterfeit image detection system. Note that no personal data regarding users' identities needs to be uploaded to the cloud-based servers, only camera source verification datasets and outcomes. By federating new trained models based on training data uploaded from a plurality of locations, performance of a counterfeit image detection system can be continuously improved over the lifetime of the system.

In other examples, other types of cameras and illumination could be used with techniques discussed herein. For example, ultraviolet (UV) cameras could be used for anti-spoofing applications as discussed herein. A UV illuminator can produce a singular precise burst of UV light that could be used to determine a spoof challenge image while maintaining eye safety. Similarly, time of flight cameras and LIDAR can be used to generate enrollment and challenge images to determine liveness. UV illuminators and cameras, along with time of flight cameras and LIDAR all have the problem of being expensive for a given resolution but could be used as counterfeit detection systems.

Figure 6:
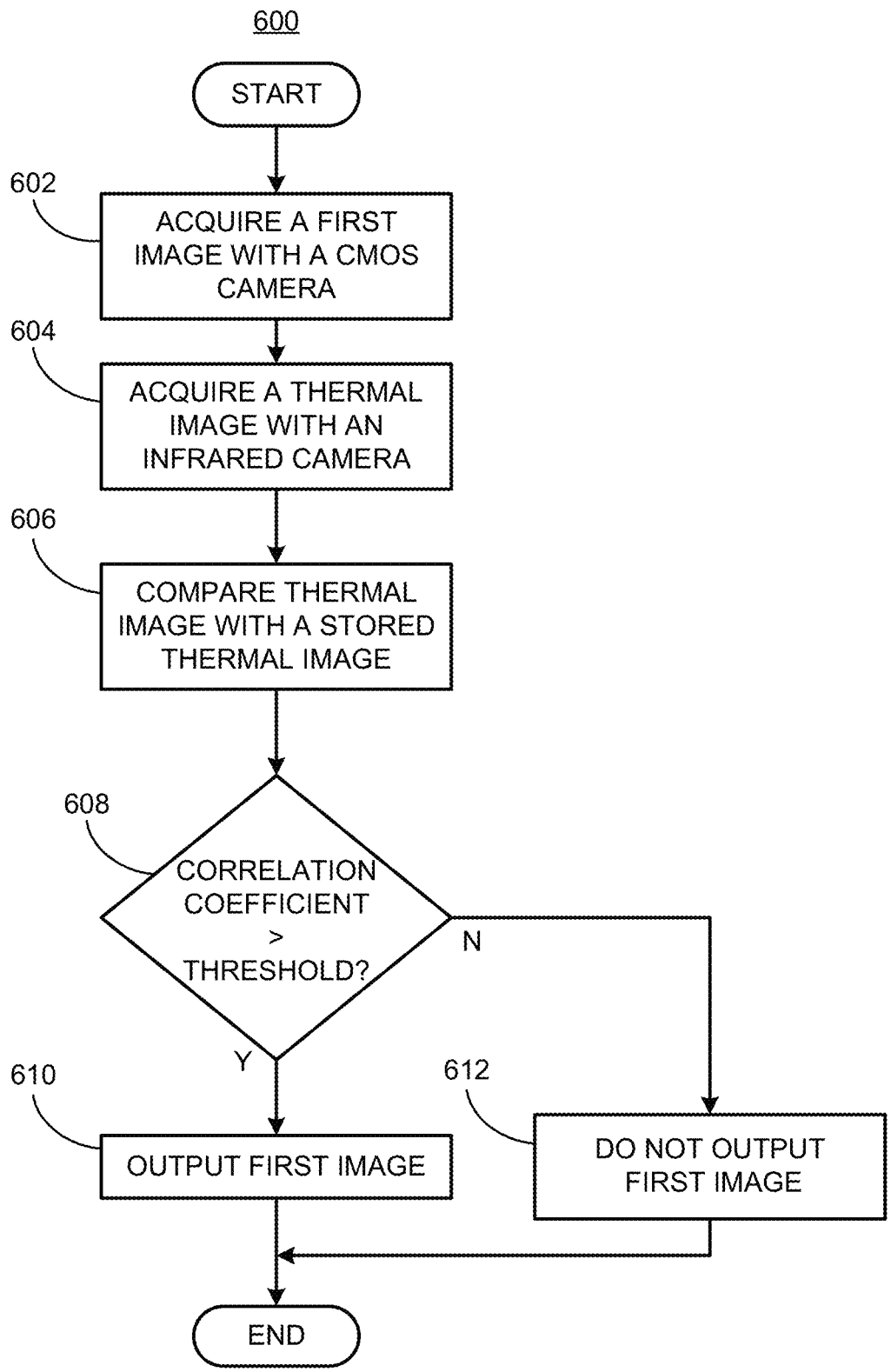
FIG. 6 is a flowchart diagram of an example process to determine counterfeit images.

FIG. 6 is a diagram of a flowchart, described in relation to FIGS. 1-5, of a process 600 for determining subject liveness using infrared images. Process 600 can be implemented by a processor of a computing device such as a computing device 115, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where a computing device 115 acquires a grayscale or color image 200 using a visible and NIR light camera 204. The visible and NIR light camera 204 can be a sensor 116 included in a vehicle, for example.

At block 604 the computing device 115 acquires an infrared image 300 using an infrared camera 306. The infrared camera 306 can be a sensor 116 included in a vehicle, for example. The grayscale or color image 200 and the infrared image 300 can be acquired by cameras having overlapping fields of view and the two images can be acquired at about the same time, within 100 milliseconds for example, to permit a human face that appears in both images to occupy approximately the same percentage of the image within +/−10% at about the same position, or +/−25 pixels, for example. The amount of overlap and the tolerance on misalignment is determined by the alignment accuracy of the two images required by the facial recognition software. In examples where the accuracy of the alignment is not sufficient to support accurate facial recognition on the combined images, additional processing can be performed to determine and align the human faces in the two images.

At block 606 the computing device 115 the computing device 115 compares the thermal profile included in the acquired infrared image 300, or infrared challenge image, with a thermal profile of a human face from previously acquired infrared image 300, the infrared enrollment image. As discussed above in relation to FIG. 3, a fakeness score can be determined by correlating the thermal profile from the infrared challenge image with the thermal profile from the infrared enrollment image using equation (1), above.

At block 608, the fakeness score is compared to an empirically determined threshold. The threshold can be determined by acquiring a plurality of infrared images of real and counterfeit human faces and determining fakeness scores using equation (1). A threshold can be selected that distinguishes between real and counterfeit human faces. If the fakeness score exceeds the threshold, the thermal profile from the challenge image is determined to be real human face and process 600 passes to block 610. If the fakeness score is less than or equal to the threshold, the thermal profile from the challenge image is determined to be counterfeit and process 600 passes to block 612.

At block 610, the grayscale or color image 200 acquired at block 602 is determined to correspond to a live human face; therefore the grayscale or color image 200 can be output to a process executing on a computing device 115 that performs biometric authentication using facial recognition software as discussed above. Following successful facial recognition, computing device 115 can determine that the person in the grayscale or color image has been authenticated. Based on the authentication, computing device 115 can grant access to a user to a vehicle by opening a door or grant permission to operate a vehicle by enabling controls, for example. In other examples, based on the authentication, computing device 115 can grant access to a room by unlocking a door or grant access to a computer or computer files. Following block 610, process 500 ends.

At block 612, the grayscale or color image 200 acquired at block 602 is determined to not correspond to a live human face, and therefore is not output to a process executing on computing device 115 to perform biometric authentication using facial recognition software. In this example, the user corresponding to the grayscale or color image 200 would be denied access to a vehicle or room and would not be granted permission to access computer files or operate a vehicle. Following block 512, process 500 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
    a processor; and
    a memory, the memory including instructions executable by the processor to:
        acquire a first image with a visible and near infrared (NIR) light camera that acquires both visible light and NIR light to generate the first image based on both the visible light and the NIR light;
        acquire a second image with an infrared camera, wherein the infrared camera has a lower x, y resolution than the visible and NIR light camera;
        extract first features from the second image;
        evaluate the second image to determine that the second image includes one of a real human face and a counterfeit human face that is a spoofed human face by comparing the first features extracted from the second image with second features extracted from a previously acquired enrollment image of a person enrolled in a biometric identification system acquired with the infrared camera; and
        when the second image includes the human face as determined by evaluation of the second image, output the first image to the biometric identification system.

2. The computer of claim 1, wherein the visible and NIR light camera is configured to detect visible and NIR light reflected by the human face.

3. The computer of claim 2, wherein the visible and NIR light camera is configured to detect light at one or more wavelengths in a 400 to 1000 nanometer range.

4. The computer of claim 1, wherein the infrared camera is configured to detect infrared light emitted by the human face.

5. The computer of claim 4, wherein the infrared camera is configured to detect light at one or more short wave infrared light in a 1000 to 2500 nanometer range.

6. The computer of claim 4, wherein the infrared camera is configured to detect light at one or more long wave infrared light in an 8000 to 14000 nanometer range.

7. The computer of claim 1, wherein the first image and the second image are co-registered whereby the first and second image can be combined to form a multispectral image.

8. The computer of claim 1, the instructions further including instructions to compare the second image with the enrollment image based on one or more of histogram-based statistics and a correlation coefficient.

9. The computer of claim 8, the instructions further including instructions to determine a fakeness score based on multiplying the correlation coefficient by a scaling factor.

10. The computer of claim 1, the instructions including further instructions to determine an identity of a human face by processing the first image using facial recognition software.

11. The computer of claim 10, the instructions further including instructions to operate a vehicle based on the identity of the human face.

12. The computer of claim 10, the instructions further including instructions to grant access to at least one of a computer, a cell phone, or a physical space based on the identity of the human face.

13. A method comprising:
    acquiring a first image with a visible and near infrared (NIR) light camera that acquires both visible light and NIR light to generate the first image based on both the visible light and the NIR light;
    acquiring a second image with an infrared camera, wherein the infrared camera has a lower x, y resolution than the visible and NIR light camera;
    extracting first features from the second image;
    evaluating the second image to determine that the second image includes one of a real human face and a counterfeit human face that is a spoofed human face by comparing the first features extracted from the second image with second features extracted from a previously acquired enrollment image of a person enrolled in a biometric identification system acquired with the infrared camera; and when the second image includes the human face as determined by evaluation of the second image, output the first image to the biometric identification system.

14. The method of claim 13, wherein the visible and NIR light camera configured to detect visible and NIR light reflected by the human face.

15. The method of claim 14, wherein the visible and NIR light camera is configured to detect visible and NIR light at one or more wavelengths in a 400 to 700 nanometer range.

16. The method of claim 13, wherein the infrared camera is configured to detect infrared light emitted by the human face.

17. The method of claim 16, wherein the infrared camera is configured to detect infrared light at one or more short wave infrared light in a 1000 to 2500 nanometer range.

18. The method of claim 16, wherein the infrared camera is configured to detect light at one or more long wave infrared light in an 8000 to 14000 nanometer range.

19. The method of claim 13, wherein the first image and the second image are co-registered whereby the first and second image can be combined to form a multispectral image.

20. The method of claim 13, further comprising comparing the second image with the enrollment image based on one or more of histogram-based statistics and a correlation coefficient.

* * * * *